M. A. SHIFLER.
LOCK NUT.
APPLICATION FILED JULY 12, 1909.
953,644.
Patented Mar. 29, 1910.
2 SHEETS—SHEET 1.
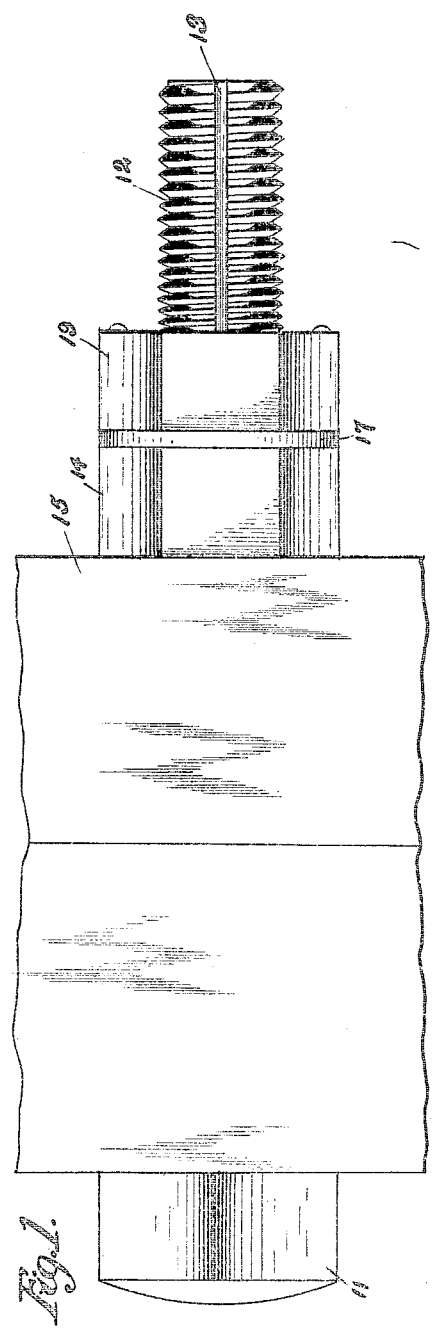
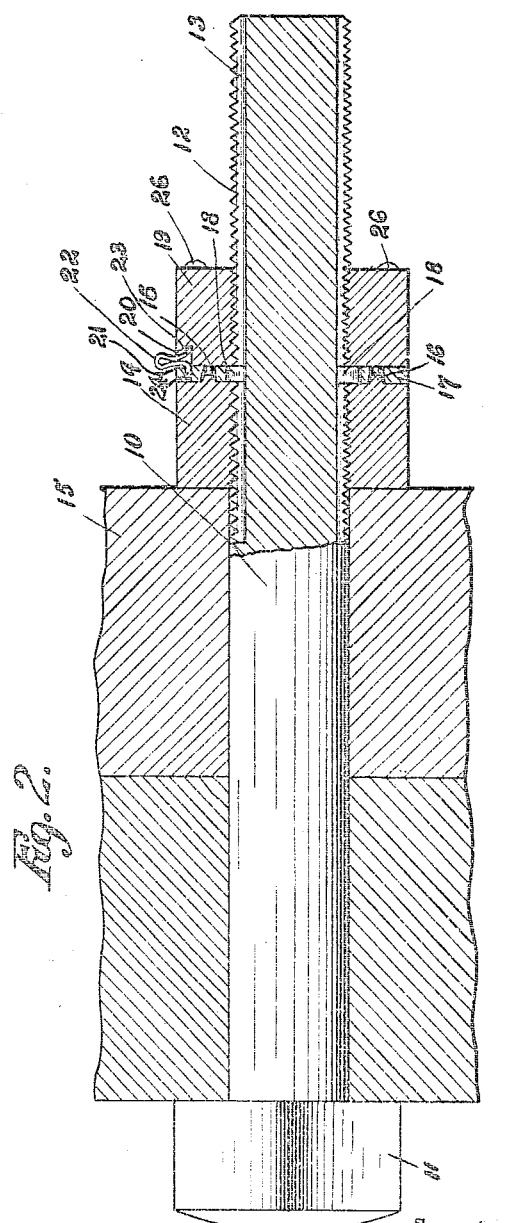
Witnesses
Inventor
Milton A. Shifler.
By
Attorneys

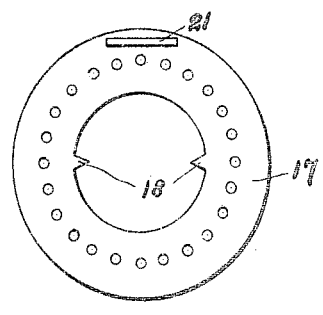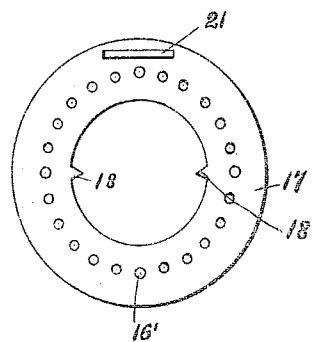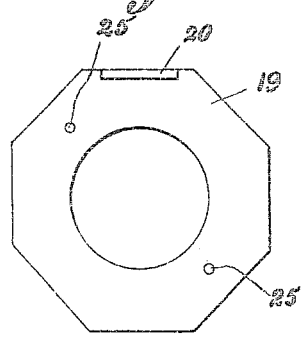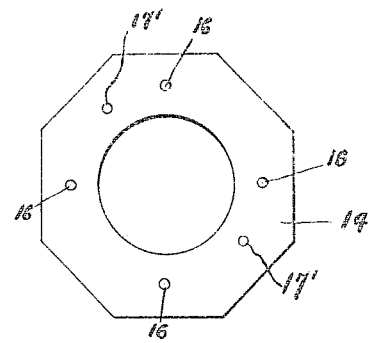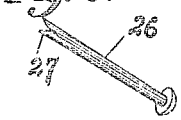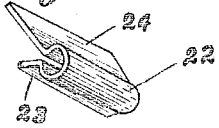

UNITED STATES PATENT OFFICE.

MILTON A. SHIFLER, OF IOLA, KANSAS.

LOCK-NUT.

953,644.  Specification of Letters Patent.  Patented Mar. 29, 1910.

Application filed July 12, 1909. Serial No. 507,085.

*To all whom it may concern:*

Be it known that I, MILTON A. SHIFLER, a citizen of the United States, residing at Iola, in the county of Allen, State of Kansas, have invented certain new and useful Improvements in Lock-Nuts; and I do hereby declare the following to be a full, clear, and exact description of the invention, such as will enable others skilled in the art to which it appertains to make and use the same.

The invention relates to a nut lock for use on threaded bolts.

The primary object of the invention is the provision of a nut lock in which the same is held against accidental displacement from the bolt and at the same time will permit the ready removal of the nut so that the bolt can be withdrawn from the parts connected thereby without damaging either the bolt or the nut.

Another object of the invention is the provision of a nut lock which includes a pair of jam nuts one of which is adapted to interlock with a washer interposed between the nuts and which washer is held against rotation on the bolt to which the nuts are applied, and a wedge key adapted to lock the other nut with the washer to secure them together and prevent the accidental displacement of the nut upon the bolt which would result in the latter becoming loose in the work.

Another object of the invention is the provision of a nut lock which is simple in construction, thoroughly reliable and efficient in operation and inexpensive in the manufacture.

With these and other objects in view the invention consists in the construction, combination and arrangement of parts, as will be hereinafter more fully described, illustrated in the accompanying drawings, which disclose the preferred form of embodiment of the invention, and as brought out in the claims hereunto appended.

In the drawings:—Figure 1 is a side elevation of a nut lock constructed in accordance with the present invention. Fig. 2 is a longitudinal sectional view thereof with the bolt partly in section. Fig. 3 is a plan view of one face of the washer. Fig. 4 is a plan view of the opposite face thereof. Fig. 5 is an inner face view of the outside nut. Fig. 6 is one face view of the inner nut. Fig. 7 is a detail perspective view of the locking key. Fig. 8 is a detail perspective view of the locking pin.

Similar reference characters indicate corresponding parts throughout the several views in the drawings.

Referring to the accompanying drawings the numeral 10, designates an ordinary bolt having the usual head 11, and the opposite screw threaded portion 12, containing at diametrically opposite points longitudinal guide grooves 13.

Fitted to the screw threaded portion 12, of the bolt is a main nut 14, which is adapted to be set up against a face of a piece of work 15, and the same may be of any well known shape, preferably in conformity to the shape of the nuts now in use and projecting from the outer face of this nut 14, at intervals apart are circumferentially arranged tapering spurs or lugs 16 the latter adapted to fit into correspondingly shaped holes 16' arranged in a circle provided in a washer 17, contacting with the outer face of the main nut. The number of lugs may be increased or decreased at will.

The washer 17, has a suitable central opening to receive the bolt 10, and is provided with opposed nibs or tongues 18, to slidably engage the longitudinal guide grooves 13, in the bolt to prevent the rotation of the washer upon the latter although allowing said washer to move longitudinally of the bolt.

Fitted upon the threaded portion of the bolt and working against the washer 17, is an auxiliary or jam nut 19, the latter containing in its periphery and opening through the inner face thereof a notch or recess 20, which latter is adapted to be brought into register with a coextensive slot 21, contained in the said washer 17, when the said nut 19 is brought into locking relation with the washer. Inserted within the notch or recess 20 is a locking key comprising a bendable strip 22, bent to form a cotter pin shape in cross section and provided with outwardly converging short and long legs or extensions 23 and 24, respectively, so that when the key is driven into the notch 20, the short leg will lie within the latter and the long leg 24, will engage the slot 21, in the washer so as to lock the latter and the nut 19, together.

Contained in the nut 19, are openings 25, which latter are adapted to register with the openings 16' arranged in a circle in the washer 17, and into which are driven locking pins 26, the same having split inner ends 27, so that when the pins are driven through the nut 19, and washer 17, their split ends will be caused to slightly spread by contacting with countersinks 17' in the main nut 14, and thereby riveting the pins and thus locking the said washer and auxiliary nut together.

It will be obvious that the lock nut will be prevented from displacement on the bolt so that the latter may become loose which would result in the ineffective function thereof.

What is claimed is:—

1. In a nut lock, the combination with a bolt, of a nut fitted upon said bolt and having outwardly projecting lugs on one face thereof, a washer having recesses to receive the lugs, the said washer containing an elongated slot near its periphery, an auxiliary nut having a notch at its periphery and opening through the inner face thereof, and means adapted to be inserted in said notch to engage the slot in the washer.

2. In a nut lock, the combination with a bolt, of a nut fitted upon said bolt and having outwardly projecting lugs on one face thereof, a washer having recesses to receive the lugs, the said washer containing an elongated slot near its periphery, an auxiliary nut having a notch at its periphery and opening through the inner face thereof, means adapted to be inserted in said notch to engage the slot in the washer, the said washer and auxiliary nut containing registering openings, and locking pins engaging said openings.

I testimony whereof, I affix my signature, in presence of two witnesses.

MILTON A. SHIFLER.

Witnesses:
   FRANK S. BEATTIE,
   J. E. WILLIAMS.